United States Patent
Van Den Ham

(10) Patent No.: US 12,062,775 B2
(45) Date of Patent: Aug. 13, 2024

(54) LOW-TEMPERATURE PREPARATION OF CATHODE ACTIVE MATERIAL

(71) Applicant: Nederlandse Organisatie voor toegepast-natuurwetenschappelijk onderzoek TNO, s-Gravenhage (NL)

(72) Inventor: Evert Jonathan Van Den Ham, Wijk en Aalburg (NL)

(73) Assignee: NEDERLANDSE ORGANISATIE VOOR TOEGEPAST-NATUUR-WETENSCHAPPELIJK ONDERZOEK TNO, Rotterdam (NL)

( * ) Notice: Subject to any disclaimer, the term of this patent is extended or adjusted under 35 U.S.C. 154(b) by 957 days.

(21) Appl. No.: 16/769,216

(22) PCT Filed: Dec. 10, 2018

(86) PCT No.: PCT/NL2018/050826
§ 371 (c)(1),
(2) Date: Jun. 2, 2020

(87) PCT Pub. No.: WO2019/112436
PCT Pub. Date: Jun. 13, 2019

(65) Prior Publication Data
US 2021/0175490 A1    Jun. 10, 2021

(30) Foreign Application Priority Data
Dec. 8, 2017  (EP) .................................. 17206224

(51) Int. Cl.
*H01M 4/1391* (2010.01)
*H01M 4/04* (2006.01)
(Continued)

(52) U.S. Cl.
CPC ....... *H01M 4/1391* (2013.01); *H01M 4/0404* (2013.01); *H01M 4/0471* (2013.01);
(Continued)

(58) Field of Classification Search
CPC ............. H01M 4/1391; H01M 4/0404; H01M 4/0471; H01M 4/131; H01M 4/505;
(Continued)

(56) References Cited

FOREIGN PATENT DOCUMENTS

| CN | 103337615 | | 10/2013 | | |
|----|-----------|---|---------|---|---|
| CN | 107408667 A | * | 11/2017 | ........... | C01G 53/006 |

(Continued)

OTHER PUBLICATIONS

International Search Report and Written Opinion for PCT/NL2018/050826, mailed Apr. 2, 2019, 13 pages.
(Continued)

*Primary Examiner* — Kaity V Chandler
(74) *Attorney, Agent, or Firm* — MORRISON & FOERSTER LLP

(57) ABSTRACT

The invention discloses a method of preparing a current collector surface enriched with cathode active material. The method comprises preparing a precursor solution by dissolving at least two metal salts and one or more organic acids in a first solvent, adding one or more basic compounds and one or more non-metallic salts to the precursor solution, diluting the precursor solution by adding a second solvent, preparing a surface-treated current collector by disposing at least part of the diluted precursor solution on a current collector surface material, and heating the surface-treated current collector at a temperature of 500° C. or less under an oxidative or inert atmosphere, thereby decomposing the diluted precursor solution.

24 Claims, 3 Drawing Sheets

(51) Int. Cl.
　　　*H01M 4/131*　　　(2010.01)
　　　*H01M 4/505*　　　(2010.01)
　　　*H01M 4/525*　　　(2010.01)
　　　*H01M 10/0525*　　(2010.01)
　　　*H01M 4/02*　　　　(2006.01)

(52) U.S. Cl.
　　　CPC ........... *H01M 4/131* (2013.01); *H01M 4/505* (2013.01); *H01M 4/525* (2013.01); *H01M 10/0525* (2013.01); *H01M 2004/028* (2013.01)

(58) Field of Classification Search
　　　CPC ............. H01M 4/525; H01M 10/0525; H01M 2004/028; H01M 10/052; Y02E 60/10
　　　See application file for complete search history.

(56) References Cited

FOREIGN PATENT DOCUMENTS

| CN | 105552327 B | * | 3/2018 | ............ H01M 4/505 |
| EP | 2 947 178 | | 11/2015 | |
| KR | 20180093079 A | * | 8/2018 | ........ H01M 10/0525 |
| WO | WO-2014034430 A1 | * | 3/2014 | ............. C01G 53/00 |

OTHER PUBLICATIONS

Porthault et al., "Synthesis of LiCoO$_2$ thin films by sol/gel process," Journal of Power Sources (2010) 195:6262-6267.

* cited by examiner

LOW-TEMPERATURE PREPARATION OF CATHODE ACTIVE MATERIAL

CROSS-REFERENCE TO RELATED APPLICATIONS

This application is the national phase of PCT application PCT/NL2018/050826 having an international filing date of Dec. 10, 2018, and published as WO 2019/112436 on Jun. 13, 2019, which claims benefit of European patent application No. 17206224.2 filed Dec. 8, 2017. The contents of the above patent applications are incorporated by reference herein in their entireties.

The invention is directed to a method of preparing a current collector surface enriched with cathode active material, and to a current collector surface enriched with cathode active material.

From personal devices to automobiles, industries such as these face continuously evolving demands concerning energy-storage. To enhance battery performance and lifetime, an understanding of electrode composition is of key importance.

Ever since the commercialisation of the first lithium-ion battery (containing lithium cobalt oxide as the layered transition metal oxide cathode) by SONY™ in 1991, the use hereof receives most attention and is slowly replacing nickel-based and lead acid batteries. Despite lithium-ion batteries being relatively expensive, the price-per-cycle is the lowest. In addition thereto, lithium is a lightweight metal, providing the largest specific energy per weight, and has the greatest electrochemical potential.

Portable electronics, wireless sensing networks, toys and medical implants, amongst other applications, stress energy storage technology development. To achieve safer, smaller and more lightweight batteries, thin film lithium-ion technology has been developed.

While conventional lithium-ion batteries are not primarily developed for their small dimensions, thin film lithium-ion batteries are composed of materials which are nanometres to micrometres thick. These type of batteries generally consist of a substrate, cathode, anode, electrolyte, current collector(s), and a protection layer. As with anode materials, cathode materials are typically brought onto a predefined surface according to several possible methods. Some examples include the following.

Kuwata et al. (*Thin Solid Films* 2015, 579, 81-88) report the deposition of thin films of lithium manganese phosphate on platinum coated glass substrates by pulsed laser deposition. The optimised deposition condition includes a substrate temperature of 600° C., and an argon pressure of 1 hectopascal.

Fischer et al. (*Thin Solid Films* 2013, 528, 217-223) report the use of non-reactive radio frequency magnetron sputtering from ceramic targets, performed in a pure argon discharge, to synthesise multi-structured lithium manganese oxide cathode active materials. In addition, to acquire desired microstructure and electrochemical behaviour, a post deposition heat treatment is necessary.

Notten et al. (*J. Electrochem. Soc.* 2015, 162(3), A249-A254) report the deposition of lithium phosphate thin films by metal-organic chemical vapour deposition. Deposition at 300° C. yielded the highest ionic conductivity measured. While planar-structured surfaces could be homogeneously enriched with the cathode active material, three-dimensional depositions did not have a similar result.

Iriyama et al. (*J. Power Sources* 2014, 272, 1086-1090) report the use of aerosol deposition with nickel manganese cobalt oxide powder as the source material, resulting in thick and dense-crystalline lithium composite films. Major complaints about pulsed laser deposition, and magnetron sputtering are the required expensive environment for operation, and large amount of time required to establish a relatively thin layer. With this technique, surfaces are more readily enriched with cathode active material.

Traditional thin film lithium-ion battery technology consists of planar thin film structures (two-dimensional). Scaling down the film thickness to below several micrometres with these structures will result in a magnification of interface-dependent issues, such as diffusion of charge carriers (i.e. diffusion current), and a diminishing of battery capacity. To compensate for the loss in electrode material and maintain the battery capacity, microstructured or nanostructured three-dimensional thin film technology has been developed. The battery power of three-dimensional thin film lithium-ion batteries can be readily improved by reducing the film thickness of the cathode and anode electrodes. These current technologies for applying cathode active material on a predefined surface exhibit either harsh conditions (i.e. temperatures above 600° C. and vacuum), time-consuming, costly experimental set-up, generates thick layers, or are simply incompatible with three-dimensional thin film lithium-ion battery technology.

Therefore, there is a need to develop an accessible method for depositing cathode active material on a predefined surface, with which layer thickness is somewhat tuneable, deposition occurs homogeneously, decomposition temperature is significantly lowered, processing time is reduced, and/or the production costs are controlled.

An objective of the invention is to overcome one or more of the disadvantages faced in the prior art.

A further objective of the invention is to provide a chemical synthesis method with which cathode active material can be integrated in thin film lithium ion batteries, in particular three-dimension thin film lithium ion batteries, and without the need of high temperature.

Yet a further objective of the invention is to provide a method wherewith cathode active material is integrated in thin film lithium ion batteries with lower manufacturing costs and/or less processing time.

The inventors found that one or more of these objectives can, at least in part, be met by preparing a current collector surface enriched with cathode active material.

Accordingly, in a first aspect the invention is directed to a method of preparing a current collector surface enriched with a cathode active material comprising the follow steps:
a) preparing a precursor solution by dissolving at least two metal salts and one or more organic acids in a first solvent, said metal salts comprising lithium, and one or more selected from the group consisting of aluminium, cobalt, manganese and nickel;
b) adding one or more basic compounds and one or more non-metallic salts to the precursor solution;
c) diluting the precursor solution obtained in step b) by adding a second solvent;
d) preparing a surface-treated current collector by disposing at least part of the diluted precursor solution on a current collector surface material;
e) heating the surface-treated current collector at a temperature of 500° C. or less under an oxidative or inert atmosphere, thereby decomposing the diluted precursor solution.

In accordance with the invention, a cathode active material having a uniform thickness may be prepared on the surface of a current collector.

In accordance with the invention, a cathode active material present on the surface of a current collector may be homogeneously dispersed.

In accordance with the invention, a cathode active material may be prepared on various surface morphologies of a current collector.

In accordance with the invention, a cathode active material may be prepared on the surface of a current collector incorporating low-temperature chemical synthesis.

Figure 1:
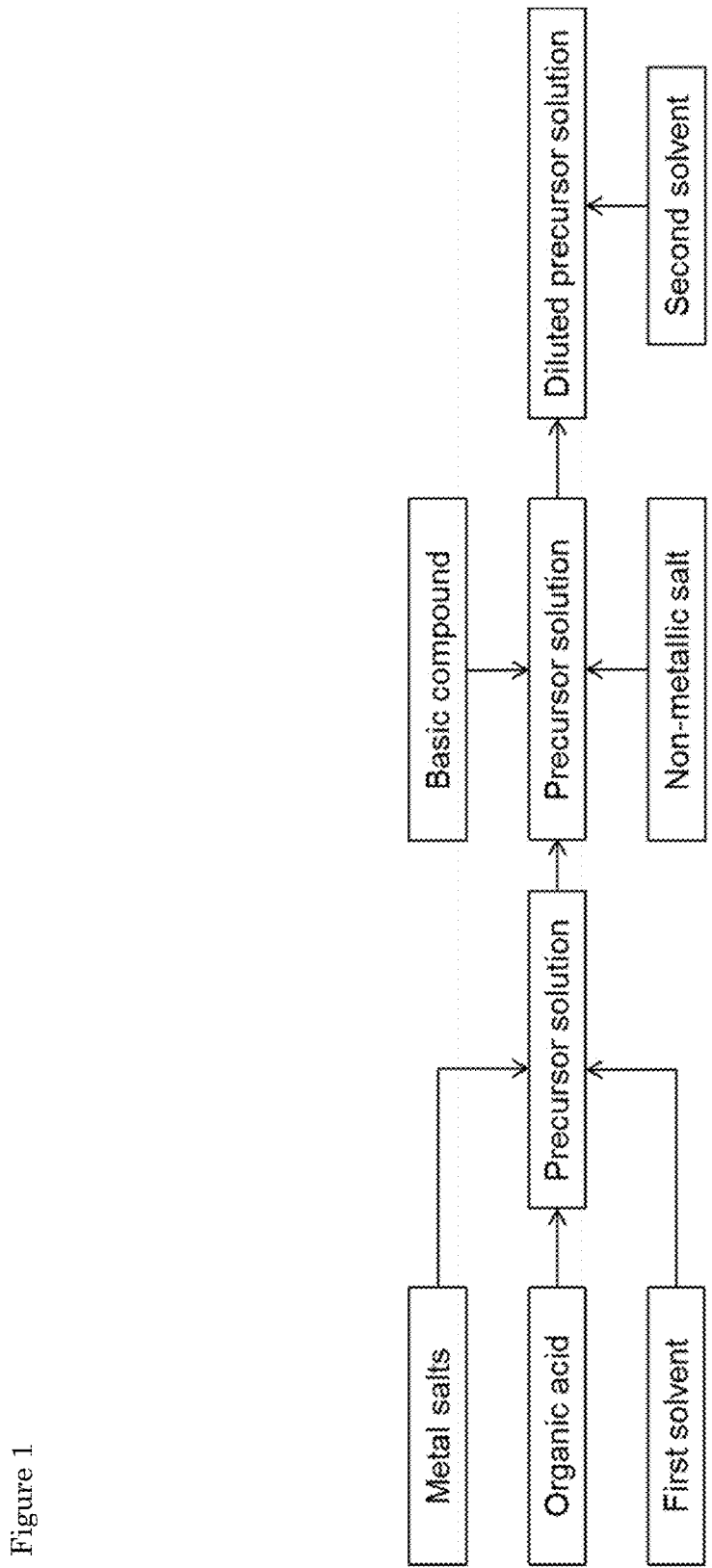
FIG. 1 illustrates steps a)-c) of the method of the invention step by step in detail.

Steps a)-c) of the method of the invention are illustrated step by step in detail in FIG. 1.

In accordance with step a), a precursor solution is prepared by dissolving metal salts and one or more organic acids in a first solvent. The organic acid(s) are likely to act as chelating agent, or ligand. In other words, a complex salt mixture of chelating agent/metal-ions may be prepared according to the above preparation step.

Herein, the acidity (or pH) is a parameter in the preparing of the precursor solution. The pH has influence on the chemical composition of the multi-metal salt mixture. The pH value of the precursor solution may be up to 8. Preferably the pH value is 2 or more. Suitably, the pH may be in the range of 6-8. A pH value or more than 8 may lead to dissociation of the multi-metal precursor solution and/or precipitation reactions.

The metal salts preferably comprise an anion which is capable of dissociating the one or more selected metal ions. The preferred anion category is oxoanions. One or more anions may be selected from the group consisting of acetate, acetylacetates, alkoxide, carbonate, chloride, citrate, formate, glycolate, hydroxide, nitrate, oxalate, perchlorate, phosphate and sulphate. In particular, acetate, acetylacetate, alkoxide, carbonate, citrate, chloride, formate, glycolate, hydroxide, nitrate, oxalate, perchlorate, sulphate, or any mixture thereof is preferred. Even more preferably, the metal salts comprise a nitrate anion.

The metal salts may be originating from metal oxides. Metal oxides may be used to react directly with one or more organic acids to form metal-acid complexes. Examples of suitable metal oxides are NiO, $Ni_2O_3$, MnO, $MnO_2$, $MnO_3$, $Mn_2O_7$, $Mn_3O_4$, CoO, $Co_2O_3$, $Co_3O_4$ and $Li_2O$.

The metal salts may comprise one or more metals selected from the group consisting of alkali metals, alkaline earth metals, lanthanides, actinides, transition metals, post-transition metals, and metalloids. The metal salts are not particularly limited so long as a salt is present containing lithium. Preferred metal salts may further comprise one or more metals selected from the group consisting of aluminium, cobalt, manganese, and nickel.

The metal salts may comprise one or more selected from the group of alkali metal oxoanion salts, alkaline earth metal oxoanion salts, lanthanide oxoanion salts, actinide oxoanion salts, transition metal oxoanion salts, post-transition metal oxoanion salts, and metalloid oxoanion salts. The metal salts are not particularly limited as long as a lithium salt is present. The metal salts may be in anhydrous and/or hydrated form. Preferred metal salts may comprise one or more selected from the group consisting of transition metal oxoanion salts and post-transition metal oxoanions. Representative examples of the metal salts include lithium nitrate, and one or more selected from the group consisting of aluminium nitrate, cobalt nitrate, manganese nitrate, and nickel nitrate.

The lithium included cathode active material may intercalate and deintercalate, and/or lithiate and delithiate lithium ions and may be commonly used for a rechargeable lithium-ion battery. In particular, it may include amorphous forms, a layered lithium composite metal oxide including a hexagonal, monoclinic, rhombohedral, or orthorhombic crystalline structure, or a spinel or olivine lithium composite metal oxide having a cubic crystalline structure. It may, for example, be represented by the following chemical formulae (1)-(5). Oxygen has been left out of the formulae to emphasise the molar ratio of the metals, though, is present in practice.

$$Li_yCo_z \quad (1)$$

In chemical formula (1): $0.1<y<2.0$, preferably $0.1<y<1.5$, more preferably $0.1<y<1.0$, even more preferably $0.5<y<1.0$. Further, in chemical formula (1): $0.1<z<2.0$, preferably $0.5<z<1.5$, or $0.1<z<1.0$.

$$Li_yMn_z \quad (2)$$

In chemical formula (2): $0.1<y<2.0$, preferably $0.1<y<1.5$, more preferably $0.1<y<1.0$, even more preferably $0.5<y<1.0$. Further, in chemical formula (2): $0.1<z<2.0$, preferably $0.5<z<1.5$.

$$Li_xNi_yMn_z \quad (3)$$

In chemical formula (3): $0.1<x<2.0$, preferably $0.5<x<1.5$, or $0.1<x<1.0$. Further, in chemical formula (3): $0.1<y<2.0$, preferably $0.2<y<1.2$, or $0.1<y<1.0$. Further, in chemical formula (3): $0.1<z<2.0$, preferably $0.8<z<1.2$, or $0.1<z<1.0$.

$$Li_wNi_xCo_yAl_z \quad (4)$$

In chemical formula (4): $0.1<w<2.0$, preferably $0.5<w<1.5$ or $0.1<w<1.0$. Further, in chemical formula (4): $0.1<x<2.0$, preferably $0.2<x<1.2$, or $0.1<x<1.0$. Further, in chemical formula (4): $0.1<y<1.0$, preferably $0.1<y<0.5$. Further, in chemical formula (4): $0<z<1.0$, preferably $0<z<0.5$, more preferably $0.01<z<0.1$.

$$Li_wNi_xMn_yCo_z \quad (5)$$

In chemical formula (5): $0.1<w<2.0$, preferably $0.5<w<1.5$. Further, in chemical formula (5): $0.1<x<2.0$, preferably $0.1<x<1.2$, more preferably $0.1<x<1.0$. Further, in chemical formula (5): $0<y<1.0$, preferably $0<y<0.5$, or $0.1<y<1.0$. Further, in chemical formula (5): $0<z<1.0$, preferably $0<z<0.5$, or $z=1-x-y$.

The lithium composite metal (oxides) of chemical formulas (1) and (3) have a layered hexagonal crystalline structure. The lithium composite metal (oxide) of chemical formula (2) has, in the case of $y=1$ and $z=1$ or $2$, a spinel crystalline structure, while in the case of $y=2$ and $z=1$ a layered crystalline structure is present. The lithium composite metal (oxide) of chemical formulae (4) and (5) have a rhombohedral crystalline structure. Chemical formulae (1)-(5) may represent the composition of amorphous material.

The one or more organic acids may be selected from the group consisting of carboxylic acids, sulphonic acids, alcohols, thiols, enols, and phenols. Preferred organic acids are carboxylic acids. Representative examples of organic acids include citric acid, aconitic acid, tricarballylic acid, trimesic acid, propionic acid, glycolic acid, lactic acid, malic acid, tartaric acid, and mandelic acid. Preferably, the one or more organic acids are selected from the group consisting of citric acid, aconitic acid, tricarballylic acid, trimesic acid, propionic acid, glycolic acid, lactic acid, malic acid, and mandelic acid. It is preferred that the one or more organic acid is a relatively small molecule (i.e. has a low molecular weight), because small molecules requires less oxygen to decompose and decomposition occurs at lower activation temperature because of the beneficial oxygen to carbon ratio. Accordingly, it is preferred that the one or more organic acids are selected from the group consisting of glycolic acid, propionic acid, lactic acid, malic acid, tartaric acid, and mandelic acid, more preferably from the group consisting of glycolic acid, propionic acid and lactic acid.

The precursor solution, including metal salts and one or more organic acids, may include any solvent or a solvent mixture that can dissolve both the metal salts and the one or more organic acids. The preferred type of solvent is polar and protic. The first solvent may comprise one or more selected from the group consisting of ammonia, t-butanol, n-butanol, n-propanol, iso-propanol, nitromethane, ethanol, methanol, 2-methoxyethanol, acetic acid, formic acid, and water. In particular, the first solvent at least comprises water.

The one or more organic acids and metal salts may be mixed in a molar ratio such that the ratio between the total mole sum of organic acid and the total metal sum is 10:1 or less, or 1:10 or less. The preferred molar ratio of organic acid to metal may be from 1:1 to 5:1 or from 1:1 to 1:5. Preferably, the molar ratio of organic acid to metal ranges from 5:1 to 1:3. When the metal salts are used in an amount excessive to the one or more organic acids, the decomposition of the diluted precursor solution in step e) may be adversely influenced. In addition, a surplus amount of metal salts to the one or more organic acids may negatively influence the cost-effectiveness.

The precursor solution may comprise one or more commercially available metal-acid complexes, such as lithium citrate.

In step b), one or more basic compounds and one or more non-metallic salts are added to the precursor solution of step a).

Herein, the pH of the precursor solution obtained in step b) may adversely influence the chemical composition. The pH value of the precursor solution obtained in step b) may be in a pH range of 5 to 9. When the pH of the precursor solution obtained in step b) is less than 5 or more than 9, the acidic, or basic condition, respectively, may adversely influence the disposing, and decomposing of the precursor solution obtained in step b), lithiation and/or intercalation mechanism. The lithiation and/or intercalation mechanism occurs during both the charging and discharging of the lithium-ion battery. Preferably, the pH value of the precursor solution obtained in step b) is in the range of pH 6 to 8.

The acidity of the precursor solution obtained in step b) is regulated by adding an amount of one or more basic compounds sufficient to obtain the precursor solution obtained in step b in a pH range from 5 to 9, or more particular, in the range from 6 to 8. The acidity can, for example, be measured with typical. pH measurement techniques consisting of pH indicators, pH test papers or strips, pH meters, or a combination of both.

The one or more basic compounds contribute to neutralising the precursor solution by elevating the pH value, and may be selected from the group consisting of ammonia, aluminium hydroxide, cobalt hydroxide, lithium hydroxide, manganese hydroxide, nickel hydroxide, pyridine or a combination thereof. In particular, ammonia, aluminium hydroxide, lithium hydroxide, nickel hydroxide and/or pyridine may be used. When one or more basic compounds selected from the group consisting of ammonium permanganate, lithium hydroxide, nickel hydroxide, aluminium hydroxide, cobalt hydroxide, and manganese hydroxide are selected, the cation already present may omit the excessive use of the above-mentioned corresponding metal salt. For example, when lithium hydroxide may be used as the sole basic compound, a lithium salt may not be added in a similar amount at step a).

The one or more non-metallic salts may contain an anion that is either identical or different to the anion of the chosen metal salts. The anionic part of the salt may be selected from the group consisting of acetate, acetylacetates, alkoxide, carbonate, citrate, chloride, formate, glycolate, hydroxide, nitrate, oxalate, perchlorate, phosphate, sulphate, and any mixture thereof. In particular, the salt may comprise one or more selected from the group consisting of acetate, carbonate, citrate, formate, glycolate, hydroxide, nitrate, oxalate, perchlorate, sulphate, and any mixture thereof. Examples of non-metallic salts include ammonium nitrate, ammonium perchlorate, ammonium permanganate, ammonium sulphate, and any combination thereof. The cation of the one or more non-metallic salts may be any non-metallic cationic species. An example of a non-metallic cationic species is ammonium.

Adding non-metallic salt may aid in lowering the decomposition temperature under both oxidative and inert atmosphere. When no non-metallic salt is added, complete decomposition may result in a higher decomposition temperature under both oxidative and inert atmosphere. In accordance with the invention, it is preferred that the anion of the non-metallic salt is the same as the anion of the metallic salts.

Preferably, the one or more non-metallic salts are added in step b) in a molar ratio between anion of the non-metallic salt and organic acid of the precursor solution in the range of 8:1 to 1:8, preferably in the range of 6:1 to 1:6, such as in the range of 4:1 to 1:4, or in the range of 2:1 to 1:2.

The organic acid may be in molar excess to the anion of the metallic salt, or vice versa. The molar ratio between organic acid and the anion of the metallic salt may be 15:1 or less. Preferably, the molar ratio between organic acid and the anion of the metallic salt is 10:1 or less, such as 9:1 or less, 8:1 or less, 7:1 or less, 6:1 or less, 5:1 or less, 4:1 or less, 3:1 or less, 2:1 or less, or even 1:1 or less. Alternatively, the molar ratio between organic acid to the anion of the metallic salt may 1:1 or less, 1:2 or less, 1:3 or less, 1:4 or less, 1:5 or less, 1:6 or less, 1:7 or less, 1:8 or less, 1:9 or less, or 1:10 or less, or even 1:15 or less.

The anion of the metallic salt and the anion of the non-metallic salt may be taken together to define a total anion amount. In accordance with a preferred embodiment, the molar amount of organic acid is more or less equal to the molar amount of this total anion amount. Hence, the molar ratio between organic acid and total anion is preferably in the range of 0.5-2, more preferably 0.6-1.8, such as 0.7-1.6, 0.8-1.4, or 0.9-1.2.

In step c) of the method, a second solvent is added to the precursor solution obtained in step b) to dilute the solution. The second solvent may comprise one or more solvents that can dissolve the precursor solution obtained in step b), and may be miscible with the first solvent. The preferred type of second solvent is polar and protic. The second solvent may comprise one or more selected from the group consisting of ammonia, t-butanol, n-butanol, n-propanol, iso-propanol, nitromethane, pyridine, ethanol, methanol, 2-methoxyethanol, acetic acid, formic acid, and water. The second solvent is preferably different from the first solvent.

The second solvent may be added to the precursor solution obtained in step b) in an amount corresponding to a volumetric ratio between the first and second solvent of 1:1 or less, to obtain a diluted precursor solution. The preferred ratio may depend on the solubility of the formed metal-acid complex in the selected first and second solvent.

A surface-treated current collector is prepared by disposing at least part of the diluted precursor solution on a current collector surface material. In other words, the surface of the current collector may be coated, wetted, sprayed, charged, covered, impregnated, infused, saturated, casted, drop casted, or any combination thereof, with at least part of the diluted precursor solution. Before the surface is treated by disposing at least part of the diluted precursor solution on the current collector surface material, the surface may be cleaned to guarantee the quality of the surface material. Such surface cleaning may involve chemical cleaning and/or physical cleaning. Examples thereof include ultraviolet light with ozone ($UV/O_3$) cleaning, and piranha cleaning.

The part of diluted precursor solution that is disposed on the current collector surface may be dependent on the selected first solvent, second solvent, metal salts, non-metallic salts, organic acid, and the combination hereof, and their solubility parameters. In particular, a part of diluted precursor solution that is disposed on the surface may result in complete coverage and/or saturation of the surface.

The current collector surface material is a material that conducts electrons and, preferably has temperature stability. The surface material may, for example, be selected from the group consisting of platinum, nickel, titanium nitride, gold, copper, tantalum, aluminium or tantalum nitride. Further, the surface material may comprise transparent conductive oxides. Such transparent conductive oxides may comprise one or more of indium tin oxide, antimony tin oxide, fluorine doped tin oxide, or aluminium doped zinc oxide.

The resulting surface-treated material is heat treated in step e) of the method of the invention, whereby the disposed diluted precursor solution is decomposed. The term "decomposed" as used herein is meant to indicate that the diluted precursor solution present on the material surface is gelated, dried in, solidified, hardened, disintegrated, attached, reacted, degraded, fragmented, partially crystallised and/or crystallised.

The heat treatment is performed at a temperature of 500° C. or less. Preferably, the heat treatment is performed at a temperature of 400° C. or less, 300° C. or less, 200° C. or less, or 100° C. or less. The heat treatment temperature may for example be in the range of from 100° C. to 500° C., such as from 200° C. to 400° C. If the heat treatment is performed at too low temperature, the diluted precursor solution may not sufficiently decompose, and therefore may negatively influence conducting properties of the cathode active material. When the heat treatment is performed at a temperature above 500° C. the cathode active material may reach near complete crystallisation or the cathode active material may degrade.

The heat treatment is performed under oxidative or inert atmosphere. Decomposition under oxidative atmosphere can be very effective, but in some cases may negatively influence the physical-chemical integration of the cathode active material on the material surface. Inert conditions may be beneficial for integration purposes. The inert atmosphere may be provided by using nitrogen, argon, helium or a mixture thereof. In particular, the heat treatment may be performed under oxidative atmosphere. Performing the heat treatment under inert atmosphere may positively influence the quality of cathode active material.

Figure 2:
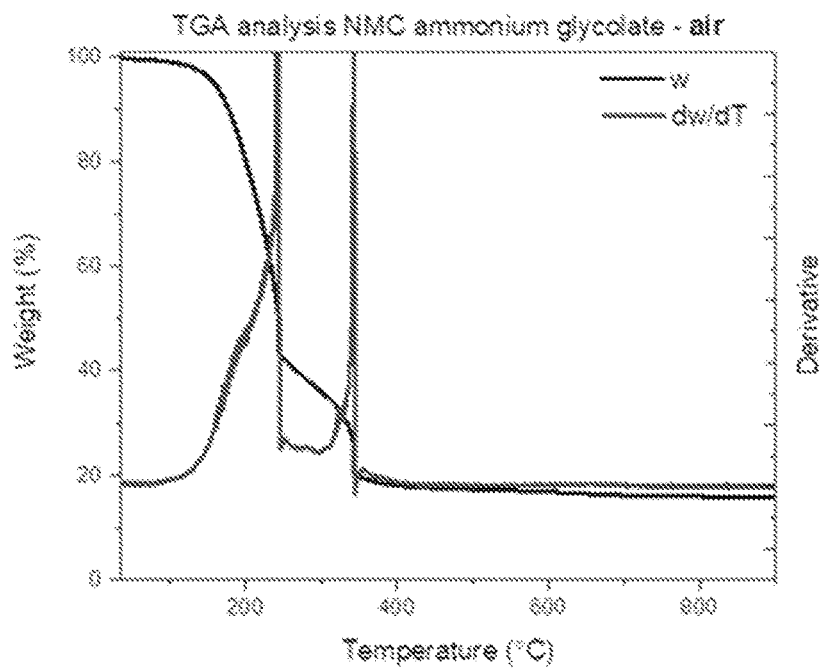
FIG. 2 depicts a thermogravimetric analysis (TGA) in air of the enriched Pt/Ti/Si surface. The heat treatment in air of a surface-treated current collector, which was prepared using a diluted precursor solution in which no non-metallic salt was added in step b), results in the TGA analysis illustrated in FIG. 2 by measuring the total weight of the surface-treated current collector at varying temperatures in a thermogravimetric analysis.
Figure 3:
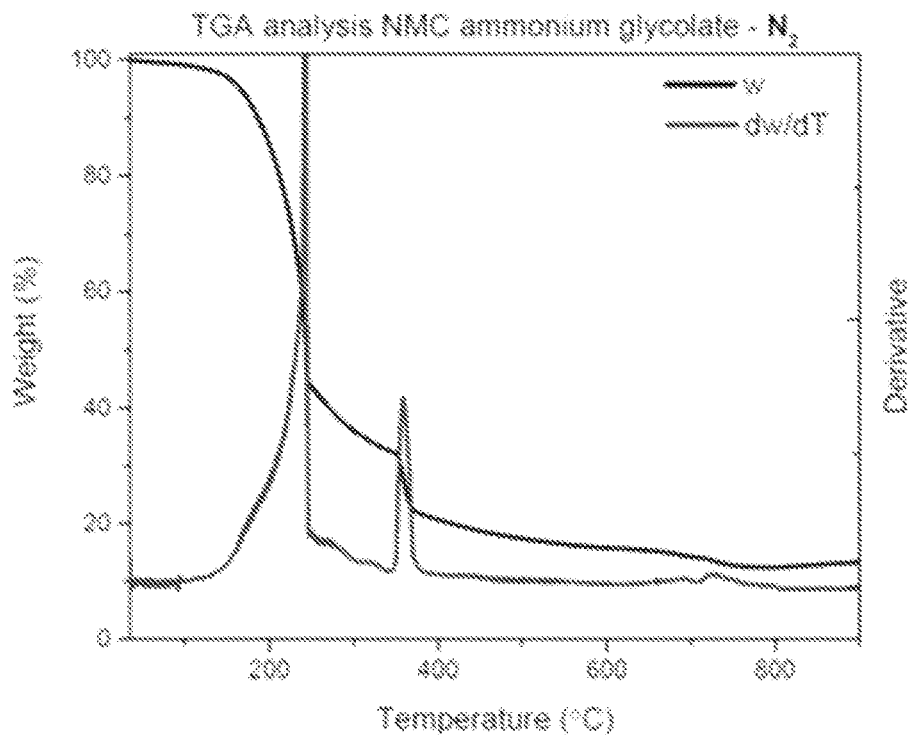
FIG. 3 depicts a thermogravimetric analysis (TGA) in nitrogen. The heat treatment under inert atmosphere of a surface-treated current collector, which was prepared using a diluted precursor solution in which no non-metallic salt was added in step b), results in the TGA analysis illustrated in FIG. 3.
Figure 4:
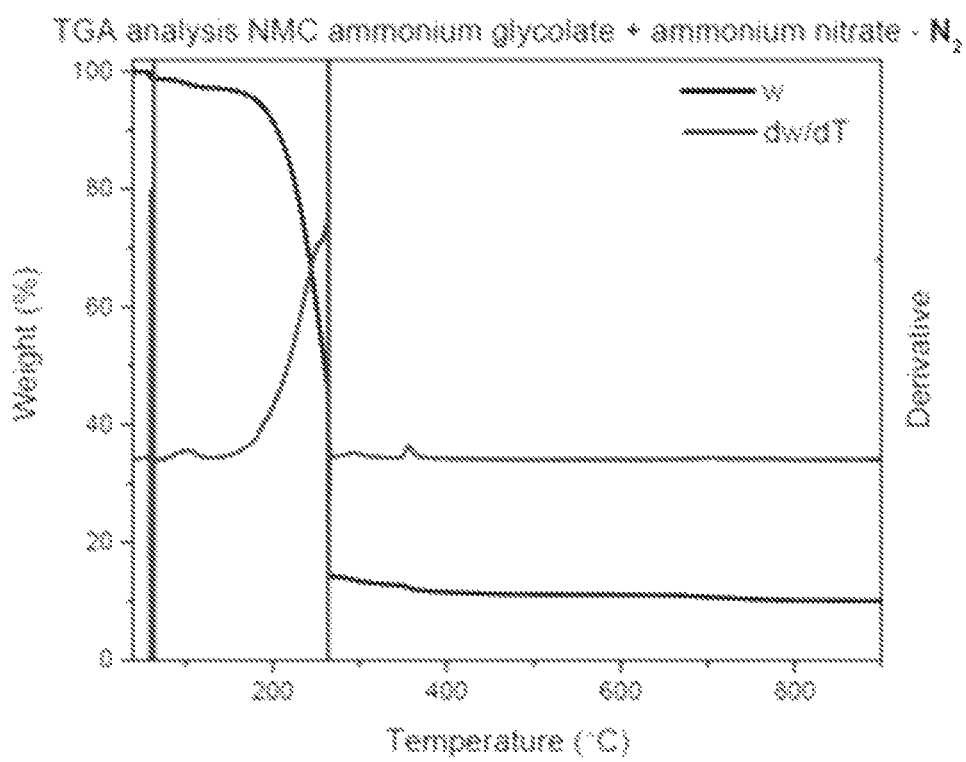
FIG. 4 depicts a thermogravimetric analysis (TGA) in nitrogen. Decomposition under inert atmosphere of a diluted precursor solution to which non-metallic salt (ammonium nitrate) has been added in step b) as mentioned above, results in the TGA analysis illustrated in FIG. 4.

The heat treatment in air of a surface-treated current collector, which was prepared using a diluted precursor solution in which no non-metallic salt was added in step b), is illustrated in FIG. 2 by measuring the total weight of the surface-treated current collector at varying temperatures in a thermogravimetric analysis. The heat treatment under inert atmosphere of a surface-treated current collector, which was prepared using a diluted precursor solution in which no non-metallic salt was added in step b), is illustrated in FIG. 3. Decomposition under inert atmosphere of a diluted precursor solution to which non-metallic salt (ammonium nitrate) has been added in step b) as mentioned above, results in FIG. 4. The diluted precursor solution to which non-metallic salt was added is more sufficiently decomposed at a lower temperature, even under inert conditions.

In a further aspect, the invention is directed to a current collector surface enriched with cathode active material. The method of the invention yields a unique material that is structurally distinguished from conventional current collectors due to the specific combination of reactants and improved decomposition of organic ligands.

In yet a further aspect, the invention is directed to a coating comprising current collector surface enriched with cathode active material. Preferably, said coating has less than 0.5% of binder material, based on total weight of the coating, more preferably less than 0.1%.

The invention has been described by reference to various embodiments, and methods. The skilled person understands that features of various embodiments and methods can be combined with each other.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by means of the following examples, which are not intended to limit the scope in any manner.

EXAMPLES

Comparative Example 1

A current collector surface enriched with cathode active material according to the invention was prepared as follows.

A mixture of 6.9 g of lithium nitrate (0.1 mol lithium), 14.6 g of nickel nitrate (0.08 mol nickel), 1.79 g of manganese nitrate (0.01 mol manganese), 1.83 g of cobalt nitrate (0.01 mol cobalt) and 45.63 g of glycolic acid (0.6 mol) in 200 ml of water was prepared by mixing at a temperature profile between 20° C. and 40° C. for 15 minutes to prepare a precursor solution.

The resulting precursor solution was neutralised by adding 10 g of ammonia (aqueous; basic compound), and mixing at a temperature profile between 20° C. and 40° C. for 15 minutes.

The resulting mixture was diluted by adding 200 ml of ethanol in order to achieve a 1:1 volumetric ratio between the first solvent (water) and second solvent (ethanol).

The diluted precursor solution was spin coated onto a Pt/Ti/Si current conductor surface material (obtained from Philips Innovation Services), whereby the surface was saturated.

The enriched Pt/Ti/Si surface was subjected to heat treatment at a temperature profile between 0° C. and 500° C. using a hotplate (Präzitherm PZ28-3TD). This heat treatment of the enriched Pt/Ti/Si surface was performed under static atmospheric conditions. A thermogravimetric analysis (TGA) in air of the enriched Pt/Ti/Si surface resulted in FIG. 2.

Comparative Example 2

This example was identical to comparative example 1, except that the heat treatment was performed under inert conditions. A thermogravimetric analysis (TGA) in nitrogen resulted in FIG. 3. This illustrates that under inert conditions, residual organic compounds only decompose at higher temperatures due to a lack of oxidiser.

Example 3

This example was identical to comparative example 2, and heat treated under the same conditions, yet, in addition to ammonia, 32 g of ammonium nitrate (0.4 mol) was added in the neutralisation step, prior to dilution. A thermogravimetric analysis (TGA) in nitrogen resulted in FIG. 4. This illustrates that addition of ammonium nitrate leads to one main decomposition at 280° C., although decomposition is complete only slightly below 400° C. due to residual carbonates. The decomposition temperature is lower compared to the examples where no ammonium nitrate was added. The added nitrates act as oxidiser, lowering the decomposition temperature, even under inert gas conditions. The latter can be of great importance to prevent oxidation elsewhere if combined with device integration.

The invention claimed is:

1. A method of preparing a current collector surface enriched with cathode active material comprising the following steps:
   a) preparing a precursor solution by dissolving at least two metal salts and one or more organic acids in a first solvent, said metal salts comprising lithium, and one or more selected from the group consisting of aluminium, cobalt, manganese and nickel;
   b) adding one or more basic compounds and one or more non-metallic salts to the precursor solution;
   c) diluting the precursor solution obtained in step b) by adding a second solvent;
   d) preparing a surface-treated current collector by disposing at least part of the diluted precursor solution on a current collector surface material;
   e) heating the surface-treated current collector at a temperature of 500° C. or less under an oxidative or inert atmosphere, thereby decomposing the diluted precursor solution.

2. The method of claim 1, wherein the metal salts comprise a lithium cation, and additionally one or more cations selected from the group of manganese, cobalt, aluminium and nickel, and one or more anions selected from the group consisting of acetate, acetylacetates, alkoxide, chloride, citrate, glycolate, hydroxide, nitrate, and oxalate.

3. The method of claim 1, wherein the molar ratio of metals present in the precursor solution, precursor solution obtained in step b), and diluted precursor solution is represented by one of the following chemical formulae in which oxygen has been omitted,

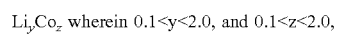

$Li_yCo_z$ wherein $0.1<y<2.0$, and $0.1<z<2.0$,

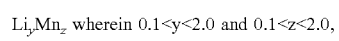

$Li_yMn_z$ wherein $0.1<y<2.0$ and $0.1<z<2.0$,

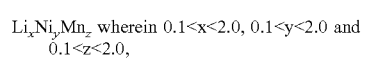

$Li_xNi_yMn_z$ wherein $0.1<x<2.0$, $0.1<y<2.0$ and $0.1<z<2.0$, $Li_wNi_xCo_yAl_z$ wherein $0.1<w<2.0$, $0.1<x<2.0$, $0.1<y<1.0$ and $0<z<1.0$, or $Li_wNi_xMn_yCo_z$ wherein $0.1<w<2.0$, $0.1<x<2.0$, $0<y<1.0$ and $0<z<1.0$.

4. The method of claim 3, wherein the molar ratio of metals present in the precursor solution, precursor solution obtained in step b), and diluted precursor solution is represented by the following chemical formula in which oxygen has been omitted, $Li_yCo_z$, wherein $0.1<y<1.5$, and $0.5<z<1.5$, or $0.1<z<1.0$.

5. The method of claim 3, wherein the molar ratio of metals present in the precursor solution, precursor solution obtained in step b), and diluted precursor solution is represented by the following chemical formula in which oxygen has been omitted, $Li_yMn_z$, wherein $0.1<y<1.5$, and
$0.5<z<1.5$.

6. The method of claim 3, wherein the molar ratio of metals present in the precursor solution, precursor solution obtained in step b), and diluted precursor solution is represented by the following chemical formula in which oxygen has been omitted, $Li_xNi_yMn_z$, wherein $0.5<x<1.5$, or $0.1<x<1.0$,
$0.2<y<1.2$, or $0.1<y<1.0$, and
$0.8<z<1.2$, or $0.1<z<1.0$.

7. The method of claim 3, wherein the molar ratio of metals present in the precursor solution, precursor solution obtained in step b), and diluted precursor solution is represented by the following chemical formula in which oxygen has been omitted, $Li_wNi_xCo_yAl_z$, wherein $0.5<w<1.5$, or $0.1<w<1.0$,
$0.2<x<1.2$, or $0.1<x<1.0$,
$0.1<y<0.5$, and
$0<z<0.5$.

8. The method of claim 3, wherein the molar ratio of metals present in the precursor solution, precursor solution obtained in step b), and diluted precursor solution is represented by the following chemical formula in which oxygen has been omitted, $Li_wNi_xMn_yCo_z$, wherein $0.5<w<1.5$,
$0.1<x<1.2$,
$0<y<0.5$, or $0.1<y<1.0$, and
$0<z<0.5$, or $z=1-x-y$.

9. The method of claim 1, wherein the molar ratio of metals present in the precursor solution, precursor solution obtained in step b), and diluted precursor solution is represented by one of the following chemical formulas in which oxygen has been omitted: $LiCo$, $LiMn$, $LiMn_2$, $Li_2Mn$, $LiNiMn$, $LiNi_{0.8}Co_{0.15}Al_{0.05}$, $LiNi_{0.8}Mn_{0.1}Co_{0.1}$, $LiNi_{1/3}Mn_{1/3}Co_{1/3}$ and $Li[Li_{0.2}Mn_{0.54}Ni_{0.13}Co_{0.13}]$.

10. The method of claim 1, wherein the first solvent comprises one or more selected from the group consisting of ammonia, t-butanol, n-butanol, n-propanol, iso-propanol, nitromethane, ethanol, methanol, 2-methoxyethanol, acetic acid, formic acid, and water.

11. The method of claim 1, wherein the second solvent comprises one or more selected from the group consisting of ammonia, t-butanol, n-butanol, n-propanol, iso-propanol, nitromethane, ethanol, methanol, 2-methoxyethanol, acetic acid, formic acid, and water.

12. The method of claim 1, wherein the organic acid comprises one or more selected from the group consisting of citric acid, aconitic acid, tricarballylic acid, trimesic acid, propionic acid, glycolic acid, lactic acid, malic acid, and mandelic acid.

13. The method of claim 1, wherein the organic acid is selected from the group consisting of glycolic acid, propionic acid, lactic acid, malic acid, tartaric acid, and mandelic acid.

14. The method of claim 1, wherein the organic acid is glycolic acid.

15. The method of claim 1, wherein the one or more organic acids are added to the metal salts in step a) in a molar ratio between organic acid and metal salts of 5:1 to 1:3.

16. The method of claim 1, wherein the basic compound comprises one or more selected from the group consisting of ammonia, aluminium hydroxide, lithium hydroxide, nickel hydroxide, or pyridine.

17. The method of claim 1, wherein the basic compound comprises ammonia.

18. The method of claim 1, wherein the one or more basic compounds are added in step b) in an amount sufficient to obtain a precursor solution in a pH range of 5 to 9.

19. The method of claim 1, wherein the one or more non-metallic salts comprise one or more selected from the group of ammonium nitrate, ammonium perchlorate, ammonium permanganate or ammonium sulphate.

20. The method of claim 1, wherein the one or more non-metallic salts are added in step b) in a molar ratio between anion of the non-metallic salt and organic acid of the precursor solution in the range of 8:1 to 1:8.

21. The method of claim 1, wherein the second solvent is added to the precursor solution in step c) in a volumetric ratio of 1:1 or less.

22. The method of claim 1, wherein the diluted precursor solution of step d) is disposed on the surface of a current collector material selected from the group consisting of platinum, nickel, titanium nitride, gold, copper, tantalum, aluminium, tantalum nitride, indium tin oxide, antimony tin oxide, fluorine doped tin oxide, and aluminium doped zinc oxide.

23. A current collector surface enriched with cathode active material obtainable by the method of claim 1.

24. A coating comprising the current collector surface of claim 23, wherein said coating has less than 0.5% of binder material, based on total weight of the coating.

* * * * *